May 2, 1939. B. N. WALLIS 2,157,042
WING, FUSELAGE, OR OTHER AIRCRAFT BODY
Filed April 13, 1938 5 Sheets-Sheet 1
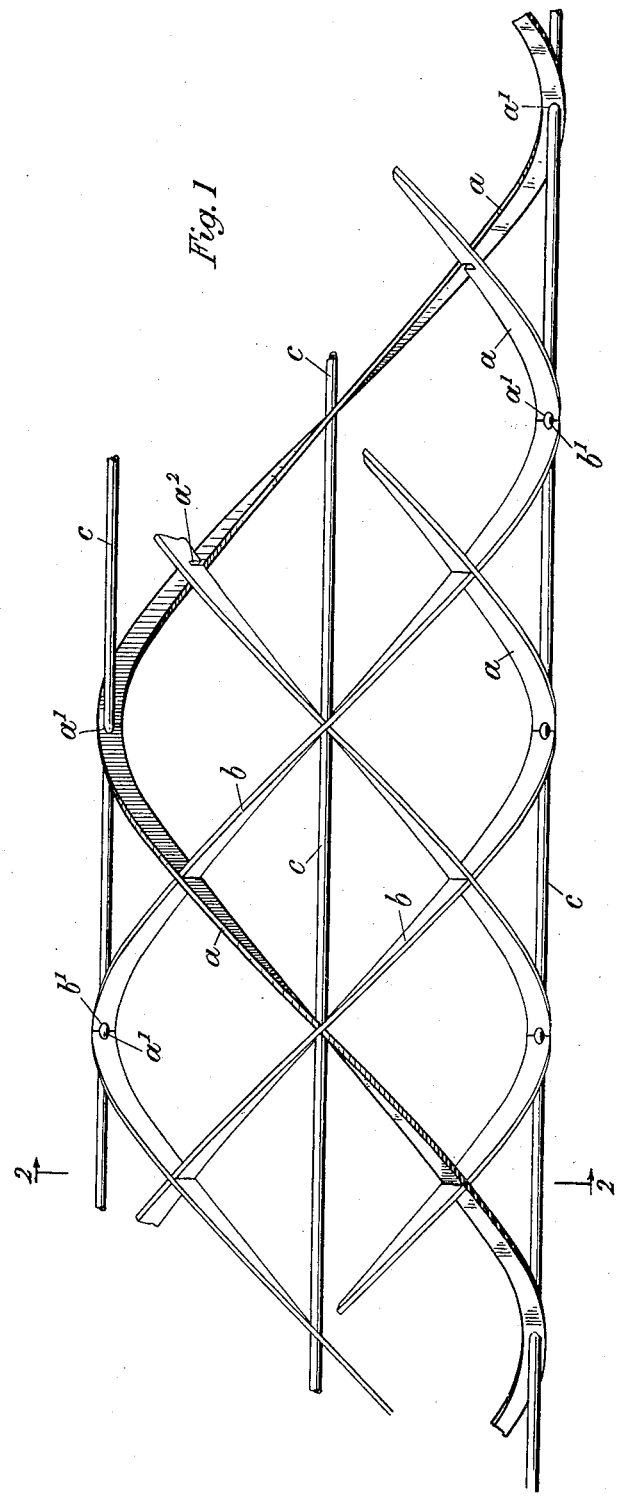

May 2, 1939.　　　　B. N. WALLIS　　　　2,157,042
WING, FUSELAGE, OR OTHER AIRCRAFT BODY
Filed April 13, 1938　　　5 Sheets-Sheet 2

Barnes Neville Wallis
Inventor

May 2, 1939. B. N. WALLIS 2,157,042
WING, FUSELAGE, OR OTHER AIRCRAFT BODY
Filed April 13, 1938 5 Sheets-Sheet 3

May 2, 1939.  B. N. WALLIS  2,157,042
WING, FUSELAGE, OR OTHER AIRCRAFT BODY
Filed April 13, 1938  5 Sheets-Sheet 4

Barnes Neville Wallis
Inventor
By

Barnes Neville Wallis
Inventor

Patented May 2, 1939

2,157,042

UNITED STATES PATENT OFFICE 2,157,042

WING, FUSELAGE, OR OTHER AIRCRAFT BODY

Barnes Neville Wallis, Weybridge, England, assignor, by mesne assignments, to Vickers-Armstrongs Limited, London, England Application April 13, 1938, Serial No. 201,811
In Great Britain April 21, 1937

4 Claims. (Cl. 244—123)

This invention relates to the construction of wing, fuselage or other aircraft bodies comprising longitudinal members and two series of bracing members of greater depth than breadth intersecting each other and the longitudinal members, arranged in geodetic lines and having their greater depth normal to the contour of the body at all points, as described in my United States Patents Nos. 1,894,104, 1,985,649 and 2,060,387.

In such structures it has hitherto been necessary to interrupt the geodetic members on the longitudinal members in order that the longitudinal members could be arranged with their axes intersecting the neutral axes of the geodetic members and in order that the longitudinal members and geodetic members could be rigidly and simply connected together, by gusset plates extending across the coincident surfaces of the longitudinal members, and geodetic members, or other connecting means.

The object of the present invention is to construct and arrange the geodetic members so as to obtain the essential requirements without having to interrupt the geodetic members on the longitudinal members which is of considerable practical importance.

According to this invention, the geodetic members are not interrupted on the longitudinal members but extend uninterruptedly past the places where such longitudinal members are to be arranged, and the bracing members are apertured to enable the longitudinal members to be threaded through them, means, such as a pin passing through the geodetic members and longitudinal members, being provided for fixing them rigidly together.

By arranging the geodetic members in this way, and by arranging them to pass without interruption where they intersect each other as described in my U. S. Patent specification No. 2,060,387, they can extend for an indefinite distance around the geodetic structure, permitting the aircraft constructor to use the most convenient lengths of geodetic members and avoiding the necessity of producing lengths of definite predetermined sizes.

A body so formed will have the geodetic members extending without interruption from one end of the body to the other, the two sets of geodetic members forming a geodetic structure of elliptical or oval shape in cross-section. Such a structure may be used itself for the fuselage or equivalent part of the aircraft for which the particular shape of structure so produced is suitable, or it may be used, in conjunction with suitable additions, such as fairings, as a wing, control surface or other aerofoil shaped aircraft part for which the shape of a body so produced would not in itself be suitable. For instance, in the case of a wing, the structure so produced of elliptical shape may form the main central part of the wing, the wing contour being secured by the attachment to the exterior of the structure, of a nose formation and a trailing edge formation, these formations being shaped to merge gradually into said structure and when attached to form a body of the usual wing contour.

It is a particular feature of the present invention that the two series of curved bracing members extending uninterruptedly are combined with longitudinal members such as tubes which are of less depth than the geodetic members, said longitudinal members passing through apertures in the geodetic members and means, such as pins passing through the geodetic members and longitudinal members, are provided for rigidly connecting them together where they intersect. Where a single longitudinal member would be insufficient to take the loads, two or more of such members are provided side by side, which longitudinal members would then be fixed together as well as to the geodetic members.

Examples of the construction of such wings, fuselages or other bodies are shown in the accompanying drawings, in which:

Fig. 1 is a side elevation illustrating diagrammatically the arrangement of the geodetic members and longitudinal members in one form of construction according to this invention, some of the geodetic members having been omitted for the sake of clearness.

Figure 6:
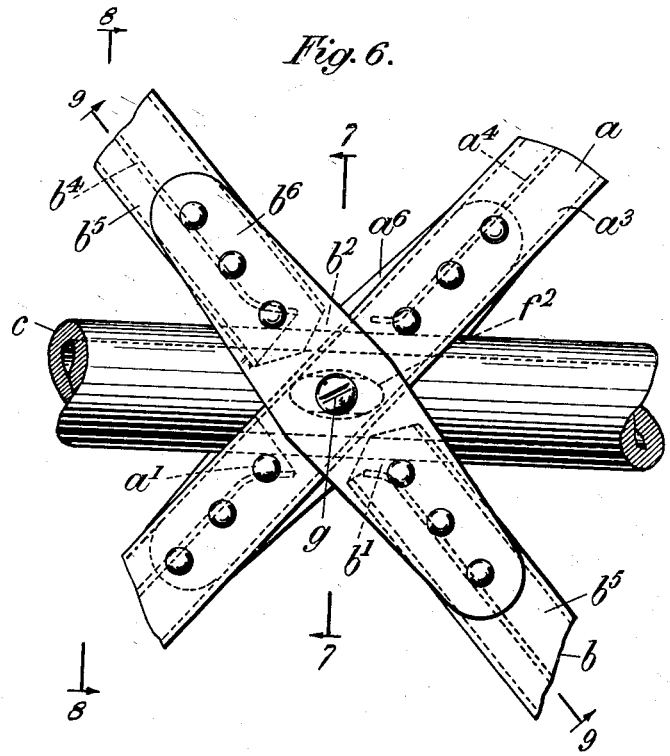
Fig. 6 is a plan view of the parts of the geodetic members and a longitudinal member arranged as shown in Fig. 5.
Figure 7:
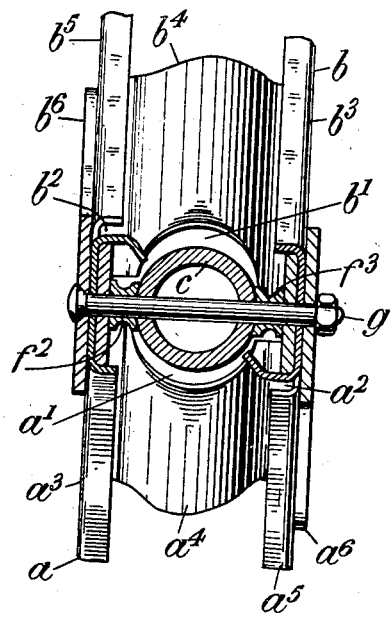
Figure 8:
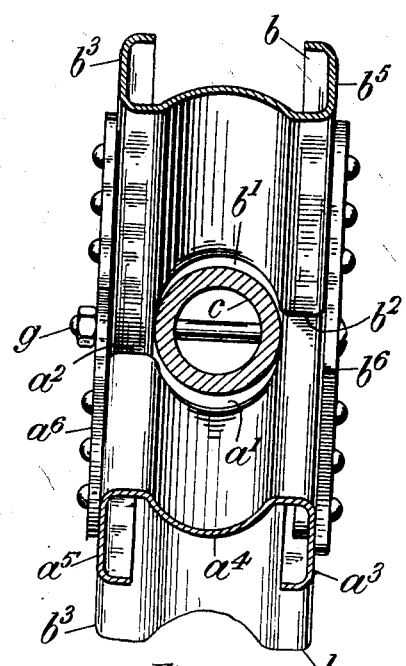
Figure 9:
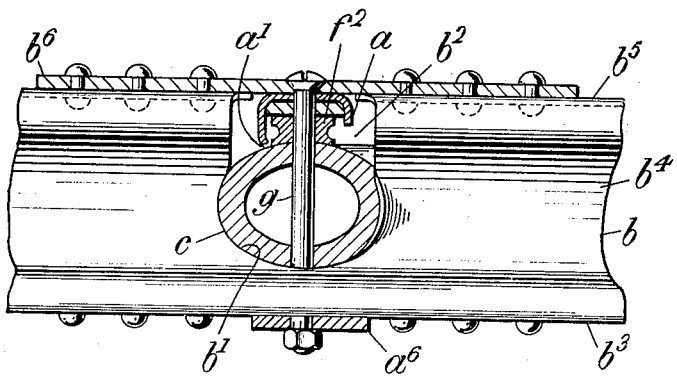

Figs. 7, 8 and 9 are sections on the lines 7—7, 8—8, and 9—9, respectively, in Fig. 6 looking in the directions of the arrows.

Figure 10:
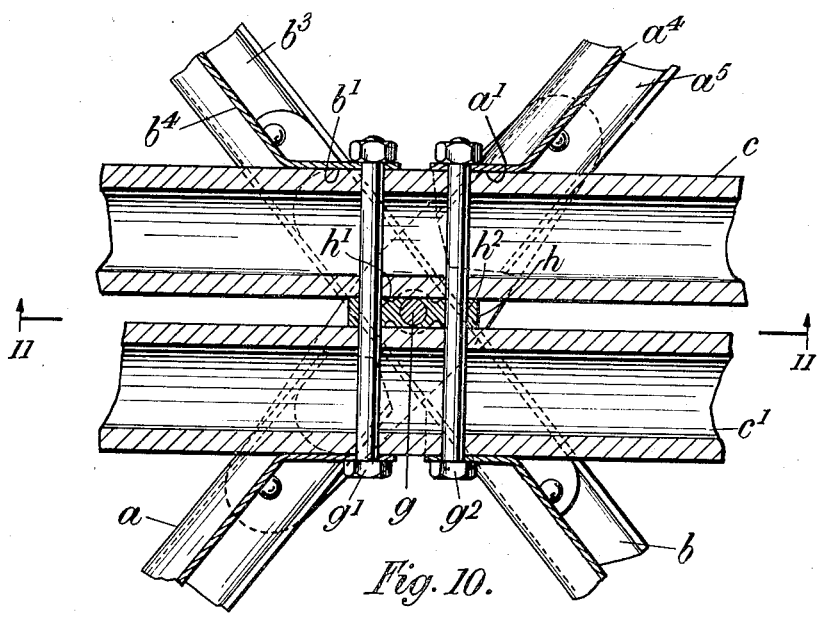

Fig. 10 is a sectional plan of the parts of the geodetic members intersecting a duplex tubular longitudinal member, the section being taken on the plane containing the axes of both tubes.

Figure 11:
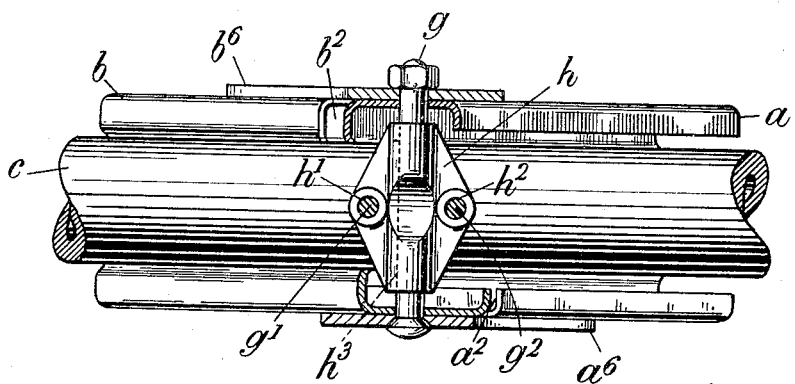

Fig. 11 is a section on the line 11—11 in Fig. 10 looking in the direction of the arrows.

Figure 2:
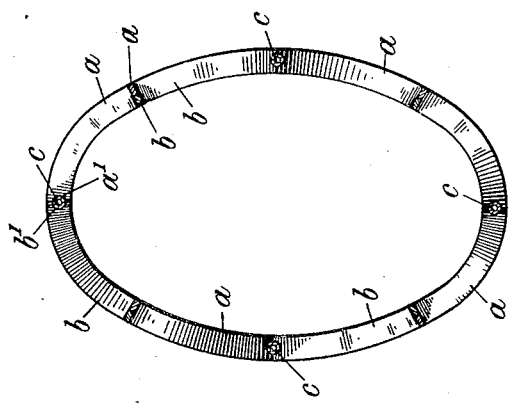
Fig. 2 is a section on the line 2—2.

As is shown diagrammatically in Figs. 1 and 2, two series of geodetic members marked $a$ and $b$ respectively extend without interruption, the webs of the geodetic members, which are directed normal to the contour of the structure at all points and are of a greater depth than the thickness of the geodetic members, are recessed at each point at which one geodetic member intersects another. Thus these geodetic members fit one into the other so that their neutral axes coincide and intersect each other and the geodetic members are not laid one over the top of the other.

Figure 3:
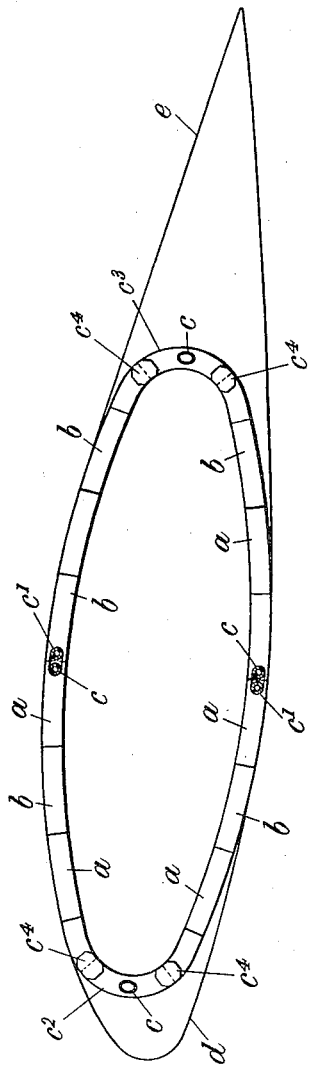
Fig. 3 is a diagrammatic view illustrating the application of a structure constructed as shown in Fig. 1 to a wing or like aerofoil surface.

The geodetic members are formed with holes $a^1$, $b^1$ respectively spaced apart from the inner and outer borders of those bracing members and located at points where the longitudinal members, which are preferably constituted by tubes $c$, are to be located and the tubes $c$ are threaded through the holes. With this construction it will be understood that the geodetic members extend uninterruptedly inside and outside the longitudinal members and may therefore be made continuous from one end of the structure to the other but preferably, for convenience in manufacture and assembly, they are built up of suitable lengths of material, the different lengths being arranged to abut and being connected together in the known way by means of fishplates which will of course be shaped to correspond with the form of the geodetic members. For instance, as indicated in Fig. 3, nose and tail sections $c^2$, $c^3$ are formed of short lengths attached to the upper and lower main parts by fishplates $c$. The upper and lower main parts may be similarly constructed and formed. Alternatively, the ends of the different lengths to be connected together may overlap and the end or ends may be joggled to preserve the continuity of the geodetic members. In all these forms, however, the final form of the geodetic members will be the same in that they will extend uninterruptedly past their intersections with each other and with the longitudinal members.

A structure built up in this way may be used to constitute the fuselage or other similar body, the geodetic members being covered by fabric or other covering material.

In the case of a wing or similar aerofoil body, the structure formed as shown in Fig. 3 may be used to form the centre part of the wing which will resist the flexural and torsional loads imposed, the necessary aerofoil shape being obtained by the addition of fairings preferably in the form of a nose formation $d$ and a trailing edge formation $e$, which are shaped to complete the required aerofoil contour and to merge gradually into the main load-taking structure.

Figure 4:
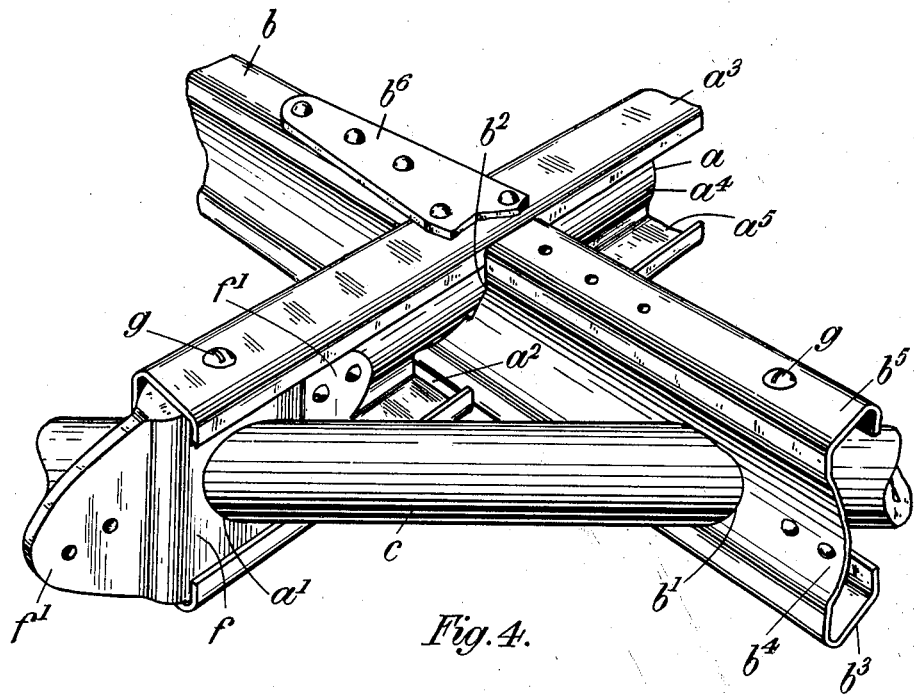
Fig. 4 is a perspective view showing a part of the two series of geodetic members and one of the longitudinal members and illustrating the arrangement where these members intersect each other.
Figure 5:
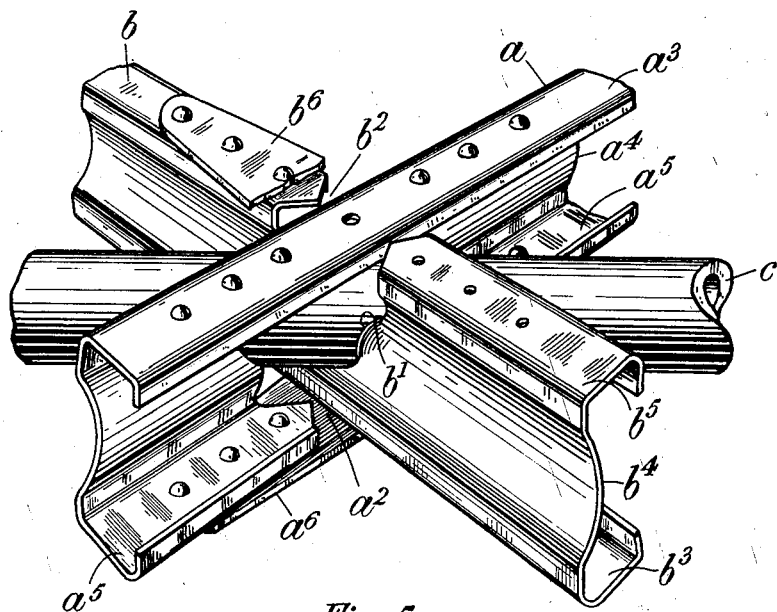
Fig. 5 is a similar view to Fig. 4 but illustrates a modified arrangement of the geodetic members and longitudinal members.

The tubular members $c$ may intersect the geodetic members $a$ and $b$ at points where the members $a$ and $b$ intersect each other, as shown in Figs. 1 and 5 to 9, or the tubes $c$ may intersect the geodetic members $a$ and $b$ at points spaced apart from their intersections with each other, as shown in Fig. 4.

In the Fig. 4 construction, the geodetic members are of channel section, the member $a$ being recessed at $a^2$ to receive the flange $b^3$ and half the web $b^4$ of the geodetic member $b$, while the member $b$ is recessed at $b^2$ to receive the flange $a^3$ and half the web $a^4$ of the geodetic member $a$. The recess $a^2$, therefore, separates the flange $a^5$ at one side of the geodetic member $b$ from its continuation on the opposite side and this recess is bridged and the flange $a^5$ is made continuous by a bridge plate $a^6$ which extends across the recess and is riveted to the flange $a^5$ at each side of the recess. Similarly the recess $b^2$ separates the flange $b^5$ of the geodetic member $b$ from its continuation on the opposite side of the geodetic member $a$ and this recess is bridged by the bridge plate $b^6$ extending across the recess and riveted to the flange $b^5$ at each side of the recess. In this construction the webs $a^4$ and $b^4$ are apertured at $a^1$ and $b^1$ for the tube $c$, and are spaced apart from the point of intersection of the geodetic members with each other. Reinforcements are provided at the point where each tube extends through the geodetic member, each reinforcement consisting of a fitting $f$ shaped closely to embrace the tube having its greatest depth above and below the centre of the tube and diminishing to opposite sides of the tube where it is formed with fillets $f^1$ adapted to fit against and be attached by rivets to the web of each geodetic member. The geodetic members are attached to the tube where they intersect by a pin $g$ extending through opposed flanges of the geodetic member, through the upper and lower parts of the reinforcing member $f$ and diametrically through the tube $c$, said pin $g$ having a countersunk head on the exterior of the structure and receiving a nut or being riveted over or expanded on the interior of the structure. The reinforcement $f$ prevents buckling of the flanges when the nut on the pin $g$ is being tightened or when the end of the pin is being riveted over or expanded. In the construction shown in Figs. 5 to 9, the arrangement is in general similar to that shown in Fig. 4 and like parts are indicated by like references in these different views but in the Figs. 5 to 9 construction, the recesses $a^2$, $b^2$ are not only shaped to receive the flanges and half the web of the intersecting geodetic member but are also shaped to form apertures for the tube $c$ which passes through these recesses. In this modified construction, instead of providing a reinforcing member which surrounds the tube, two separate distance pieces $f^2$, $f^3$ are provided to fit between the tube and the geodetic members above and below the tube, the pin $g$ passing as before through the tube and the reinforcing members and the geodetic members.

In the particular constructions described and illustrated in Figs. 4 to 9, the longitudinal members each comprise a single tube but as shown in Fig. 3 and illustrated more particularly in Figs. 10 and 11, the longitudinal members may be composed of a number of side by side tubes $c$, $c^1$. The number of such side by side tubes may be increased in certain sections and reduced in other sections, for instance three tubes may be provided in one section and these may be reduced to two tubes in the next section and to a single tube in an end section so that the number of tubes employed varies according to the load on the structure. In a multiple tube longitudinal member, in which the tubes are arranged one at either side of the point of intersection of two geodetic members with each other, the geodetic members are recessed as previously described in order to fit one within the other, the recessed parts of the webs of the geodetic members being extended to form apertures $a^1$, $b^1$ for the tubes, as in the previous construction but in this case the ends of the webs $a^4$, $b^4$ are turned inwards so as to lie against the outer borders of the tubes and to extend towards each other and these ends are apertured to receive two pins $g^1$, $g^2$ which pass through them and through the two tubes. A packing piece $h$ shaped to fit in between the two tubes $c$, $c^1$ is provided, this packing piece having holes $h^1$, $h^2$ for the pins $g^1$, $g^2$. The packing piece also has a central hole $h^3$ for the pin $g$ which extends through the packing piece and through the geodetic members and bridge pieces on their point of intersection.

The longitudinal members so arranged and braced by the geodetic members constitute the booms of a spar or spars to take the flexural loads, which booms may or may not be interconnected by webs or other direct interconnections extending across the structure in addition to the connections formed by the geodetic members. In the case of a wing as described with reference to Fig. 3, the longitudinal members arranged at the leading and trailing portions of the geodetic structure take the flexural loads induced by drag forces.

What I claim as my invention and desire to secure by Letters Patent is:

1. An aircraft member including an elliptical spar composed of continuous intersecting oppositely pitched geodetic bracing members extending unbrokenly in both directions for more than one complete pitch turn, said geodetic members being passed at their intersections by halving each member oppositely, said geodetic members formed with holes aligned from end to end of the aircraft member and a longitudinal stiffening member extending through said holes from end to end of the aircraft member and rigidly connected to the said bracing members where it passes through said holes.

2. An aerofoil including an oval spar composed of continuous intersecting oppositely pitched geodetic bracing members extending unbrokenly in both directions for more than one complete pitch turn, said geodetic members being passed at their intersections by halving each member oppositely, said geodetic members formed with holes aligned from end to end of the aerofoil, and a longitudinal stiffening member extending through said holes from end to end of said aerofoil and rigidly connected to the said bracing members where it passes through said holes.

3. An aerofoil including an elliptical spar composed of continuous intersecting oppositely pitched geodetic bracing members extending unbrokenly in both directions for more than one complete pitch turn, said geodetic members being passed at their intersections by halving each member oppositely, said geodetic members formed with holes aligned from end to end of the aerofoil and a longitudinal stiffening member extending through said holes from end to end of said aerofoil and rigidly connected to the said bracing members where it passes through said holes.

4. An aerofoil including an oval spar composed of continuous intersecting oppositely pitched geodetic bracing members extending unbrokenly in both directions for more than one complete pitch turn, said geodetic members being passed at their intersections by halving each member oppositely, said geodetic members formed with holes aligned from end to end of the spar and a longitudinal stiffening member extending through said holes from end to end of said spar and rigidly connected to the said bracing members where it passes through said holes, and a nose forming fairing secured at one edge and a trailing edge forming fairing secured to the opposite edge of said spar, said fairings merging into the sides of said spar and together therewith forming an aerofoil section.

BARNES NEVILLE WALLIS.